H. W. JACOBS & F. W. SHUPERT.
BOILER FLUE.
APPLICATION FILED JUNE 29, 1912.

1,093,429.

Patented Apr. 14, 1914.
6 SHEETS—SHEET 1.

Witnesses
R. E. Wighton
H. L. Brown

Inventors
Henry W. Jacobs
Frank W. Shupert
By Heideman Street
Attorneys.

H. W. JACOBS & F. W. SHUPERT.
BOILER FLUE.
APPLICATION FILED JUNE 29, 1912.

1,093,429.

Patented Apr. 14, 1914.
6 SHEETS—SHEET 2.

Witnesses
R. E. Wightow
H. C. Brown

Inventors
Henry W. Jacobs
Frank W. Shupert,
Heideman Street
Attorneys.

H. W. JACOBS & F. W. SHUPERT.
BOILER FLUE.
APPLICATION FILED JUNE 29, 1912.

1,093,429.

Patented Apr. 14, 1914.
6 SHEETS—SHEET 3.

Witnesses
D. E. Wighton.
N. C. Brown

Inventors
Henry W. Jacobs
Frank W. Shupert
By Heideman Street
Attorneys.

H. W. JACOBS & F. W. SHUPERT.
BOILER FLUE.
APPLICATION FILED JUNE 29, 1912.

1,093,429.

Patented Apr. 14, 1914.
6 SHEETS—SHEET 5.

Witnesses
R. E. Wightow.
H. L. Brown

Inventors
Henry W. Jacobs
Frank W. Shupert
By Heideman & Street
Attorneys

UNITED STATES PATENT OFFICE.

HENRY W. JACOBS, OF TOPEKA, KANSAS, AND FRANK W. SHUPERT, OF BRISTOL, INDIANA.

BOILER-FLUE.

1,093,429.

Specification of Letters Patent. Patented Apr. 14, 1914.

Application filed June 29, 1912. Serial No. 706,567.

*To all whom it may concern:*

Be it known that we, HENRY W. JACOBS and FRANK W. SHUPERT, citizens of the United States, and residents of Topeka, in the county of Shawnee and State of Kansas, and Bristol, county of Elkhart, and State of Indiana, respectively, have invented certain new and useful Improvements in Boiler-Flues, of which the following is a description, reference being had to the accompanying drawings, which form a part of our specification.

Our invention relates to flues for boilers of the fire tube or flue type whereby larger passages for the gases of combustion will be provided, so that the gas cross-section in the flues is greatly increased and thus permit freer passage of the gases through the flues from the fire-box to the smoke-box end of the boiler.

The object of our invention is to provide a flue wherein the surface friction of the gases will be greatly decreased and the gases allowed to pass through the flue at a very rapid velocity.

The purpose of our invention is to provide a flue construction which will not effect a retarding or slowing down in the travel of the gases and products of combustion through the flues as is the case with the construction of flues heretofore employed.

Our invention consists in constructing a boiler flue of sheet metal with substantially flat sides, so that the gases and flames will pass therethrough in long sheet-like form and result in great heating efficiency; the invention also contemplating the employment of means within the flues which will result in practically all the heat of the gases being delivered to the walls of the flue or flues; one function of the means being to break up and separate the gases and flames so as to destroy the insulating film ordinarily encountered within the fire flues of a boiler, which result from the edge or outer surface of the gas body becoming cooled down by the walls of the tubes.

Another object of our invention is to provide means whereby the flue or conductor for the products of combustion can be made more rigid between the flue sheets of the boiler and at the same time permit of contraction and expansion; the invention resulting in the production of a boiler flue whereby the continual loosening from the flue sheets is prevented, and the whipping about of the flues, in the case of a locomotive when in operation, is done away with; and wherein all rolling, expanding, and beading of the flues necessary with the present construction of flue, and which result in cracked and distorted bridges in the flue sheets, is obviated.

In the drawings: Fig. 7 is a longitudinal sectional view of a modified form of our invention applied to a locomotive boiler, with portions of the flues shown in section.

In the exemplifications of our invention it is shown in connection with locomotive type of boilers, but it will be readily understood that the invention applies to any fire tube type of boiler. The invention, however, is especially adapted to overcome the serious objections encountered in locomotive boilers, and we have, therefore, preferred to illustrate the invention in connection with locomotive boilers wherein the different courses or rings are assembled in the usual manner known to the locomotive boiler art, with the boiler shell proper being shown at 15, while 16 represents the throat-sheet of the boiler whereby the boiler is connected to the fire-box, the interior whereof is shown at 17.

18 represents the fire-box crown-sheet or fire-box sections; 19 representing the stay-sheets or staying members whereby the crown-sheet or fire-box sections are secured to the wrapper sheet or outside sections 20.

21 represents the fire-box door sheet and 22 represents the back head of the boiler.

23 is the rear or fire-box flue sheet of the boiler; while 24 is the front or boiler flue sheet.

The different parts that have just been referred to, that is the fire-box parts, the boiler shell and connections are all assembled and secured together in the usual well known manner and form no part of our present invention, so that further detailed description thereof need not be entered into.

While the fire-box shown in the drawings illustrates what is known as the "Jacobs-Shupert" type, it is to be understood that our improved boiler flue can be equally well applied to or used in connection with any other type or design of fire-box.

Figure 1:
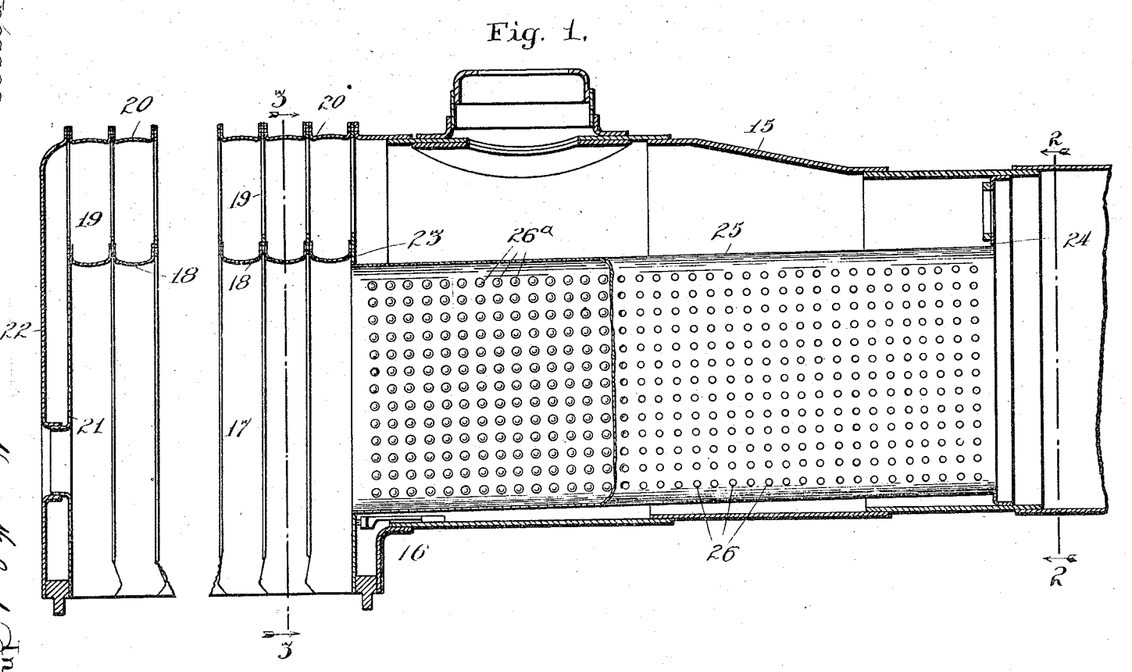
Figure 1 is a longitudinal sectional view of a locomotive boiler provided with our improved flue; a portion of the flue being shown in elevation with the other portion shown in section.
Figures 4, 5, 6:
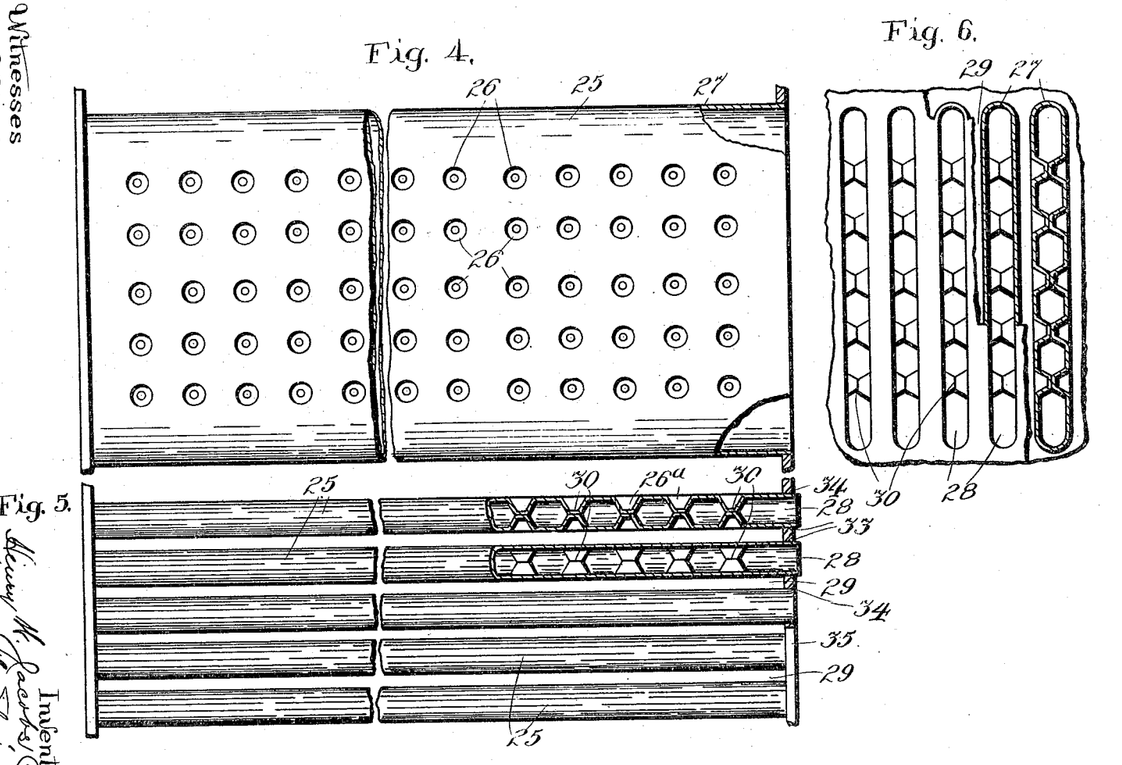
Fig. 4 is an enlarged view of our improved boiler flue showing the same in elevation with portions thereof broken away.
Fig. 5 is a partial plan view and partial sectional plan view of Fig. 4.
Fig. 6 is a partial end elevation and partial sectional view of the construction shown in Fig. 4.

The flue shown at 25 in Fig. 1 is formed of flat sheet metal, preferably of a grade of metal commensurate with the service required of a flue, namely material of efficient heat transmission and endurance, with the sheet of sufficient dimensions to produce a flue of the desired size. In the preferred form of our invention, the sheet, before it has been bent into flue form, is provided with a series of symmetrically arranged indentations or impressions as shown at 26, in Figs. 1 and 4, whereby the registering teats or studs 26ª, see Figs. 5 and 6, are produced when the sheet is bent into flue form. These teats or studs 26ª are made with a blind punch and cup on a punching machine or hydraulic press. After the sheet has been provided with the desired number of impressions, symmetrically arranged, the sheet is then bent into the oblong or transversely elongated flue as clearly shown in Figs. 1, 4, and 6, with the teats or studs 26ª arranged on the inside of the flue and directly opposite each other; the inner edges or points of the coincident or registering studs being in close proximity to each other. The abutting edges of the sheet are then welded together, forming a longitudinal seam either at the top or lower edge of the flue as indicated at 27; the seam being preferably welded by the autogenous process, although any well known process of welding may be employed which would result in a perfectly tight joint or seam being formed.

The purpose in providing the flues with the registering studs or teats 26ª located within the flue, that is within the gas space 28 of the flue, is to prevent collapsing of the flues which would be caused by the pressure within the boiler. As before stated, the studs on the adjacent faces or side walls of the flue are made to register with each other, or come directly opposite each other, so that when pressure outside of the flue, exerted in the water space 29, is encountered, the registering studs or teats 26ª will come together as indicated at 30, see Figs. 5 and 6, and thereby form staying means or bracing members for the sides of the flue and maintain an unrestricted gas passage within the flues. The flue sheets 23 and 24 are then provided with a number of slots corresponding with the transverse dimensions of the flues, as shown at 31 in flue sheet 24, and at 32 in flue sheet 23; the slots in the flue sheets being made sufficiently large to allow for clearance so that the ends of the flues may be inserted therein. The ends of the flues are preferably allowed to project through the openings in the flue sheets as shown at 33, see Fig. 5, and the edges of the slots in the flue sheet to the outside of the water space are preferably somewhat beveled as indicated at 34, in Fig. 5. The ends 33 of the flues 25 are then welded down to the flue sheets and the necessary welding stock added to fill up the bevel to a thickness equal to that of the flue sheet. It is apparent that the flues will thus be securely fastened to the flue sheets and will be able to withstand the pressure within the boiler as well as withstand the action of the flames and gases. The width of the water spaces 29, see Fig. 5, is governed by the width of the bridge 35 shown in Fig. 5, and need be no greater than that used in the art when round flues are employed.

Figure 2:
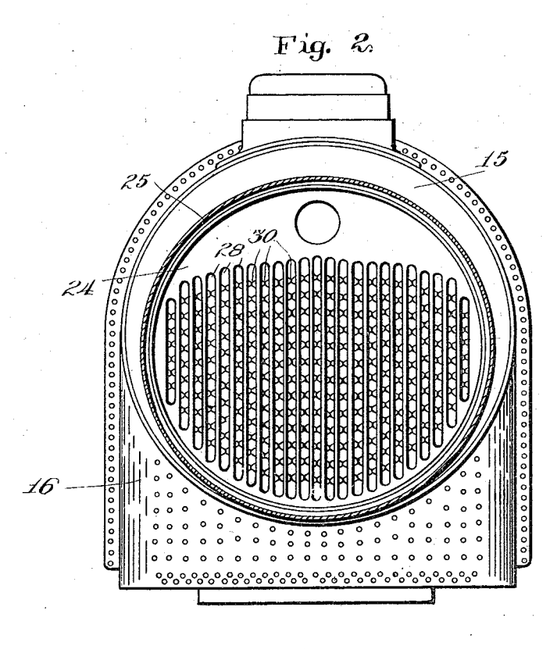
Fig. 2 is a vertical sectional view taken on the line 2—2 of Fig. 1, and looking in the direction of the arrows.
Figure 3:
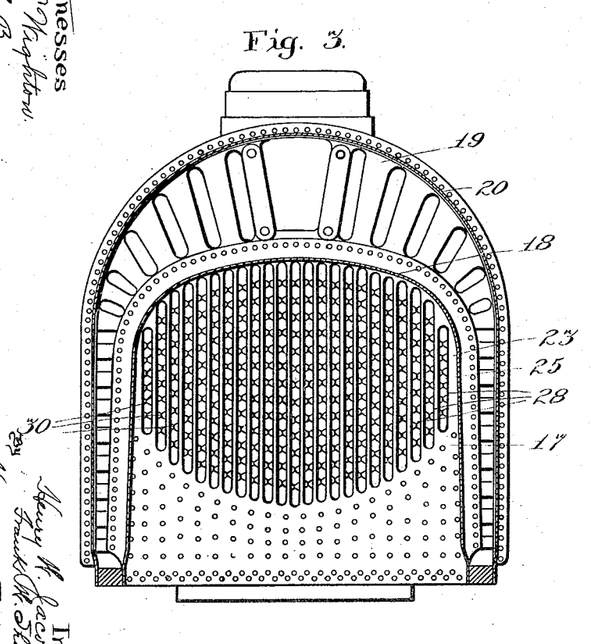
Fig. 3 is a similar view taken on the line 3—3 of Fig. 1 and looking in the direction of the arrows.
Figure 9:
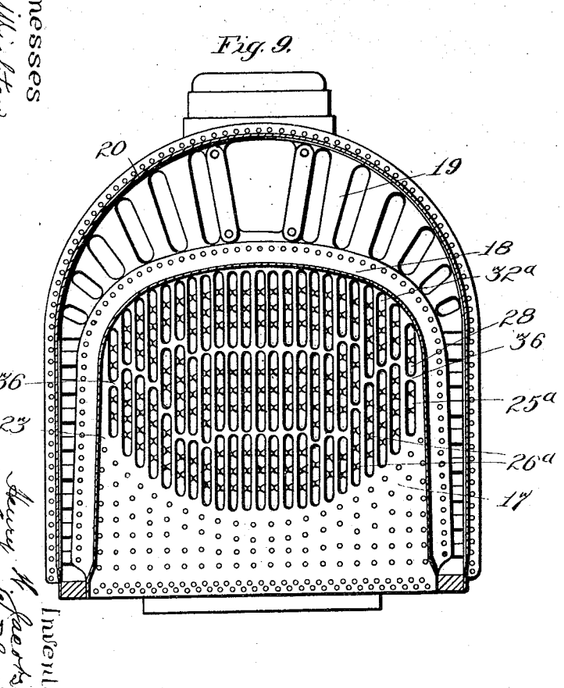
Fig. 9 is a similar view taken on the line 9—9 of Fig. 7, looking in the direction of the arrows.

In the exemplification of our invention as disclosed in Fig. 7, a modified method of arranging the flues is shown; the particular method of arrangement being more clearly set forth in Fig. 9, wherein the flues 25ª are made of smaller dimensions transversely than the flues 25, shown in Figs. 1, 2, and 3.

Figure 8:
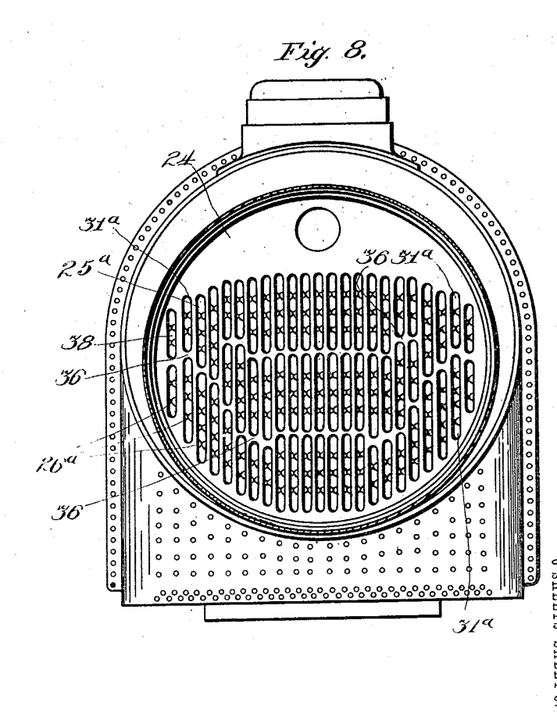
Fig. 8 is a vertical sectional view taken on the line 8—8 of Fig. 7, looking in the direction of the arrows.

In the construction shown in Figs. 7 to 9, the flue sheets 23 and 24 are provided with several series of slots divided up into a few standard sizes, thus necessitating only a few sizes of flues being carried in stock that are adapted to the flue space on the flue sheets of different sized boilers, thereby obviating the necessity for carrying a great many flues of different widths in stock to suit the height of flue space on the flue sheets of boilers of different sizes. In this arrangement or construction, the flues are separated vertically by the bridges 36, see Figs. 8 and 9, thus providing several series of flues arranged in different horizontal planes as clearly shown in Figs. 7 to 9. It is apparent that the modification shown in Figs. 7 to 9 may be an advantage over that disclosed in Figs. 1 to 3, in that repairs may be more easily made, necessitating a smaller sized flue being inserted in the event of the replacing of a damaged flue, as well as obviating the necessity for carrying a great number of different sized flues in stock. The flues shown in Figs. 7 to 9 are formed and inserted in the slots of the flue sheets in the manner previously described, with their ends welded to the flue sheets so as to form tight joints or connections.

Figure 10:
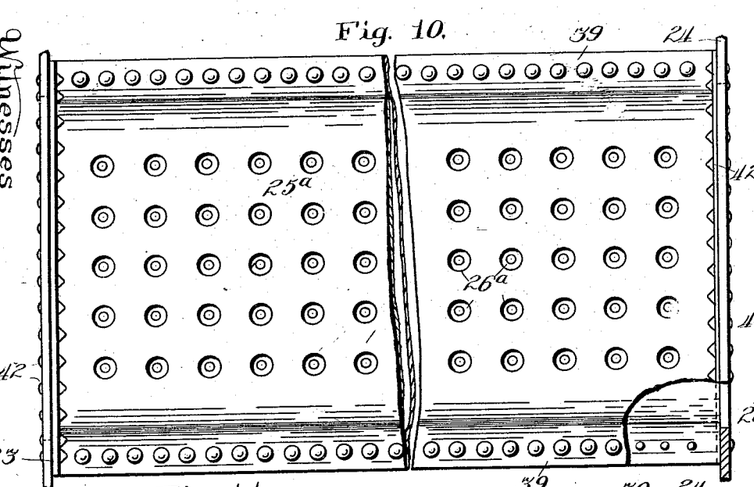
Fig. 10 illustrates a modified form of our invention, the boiler flue being shown in longitudinal elevation with portions thereof broken away.
Figure 11:
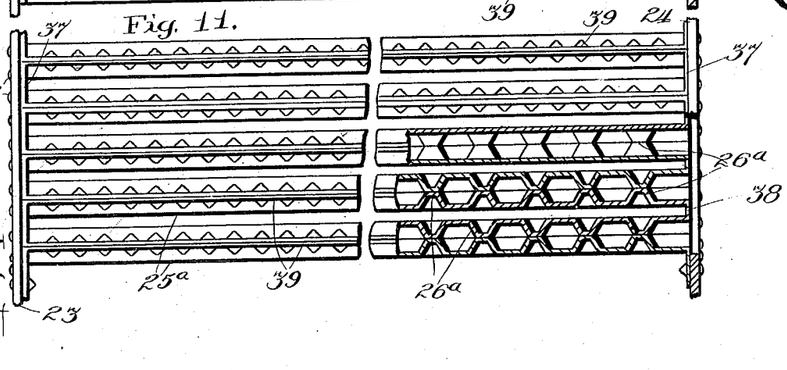
Fig. 11 is a partial plan and partial sectional plan view of Fig. 10.
Figure 12:
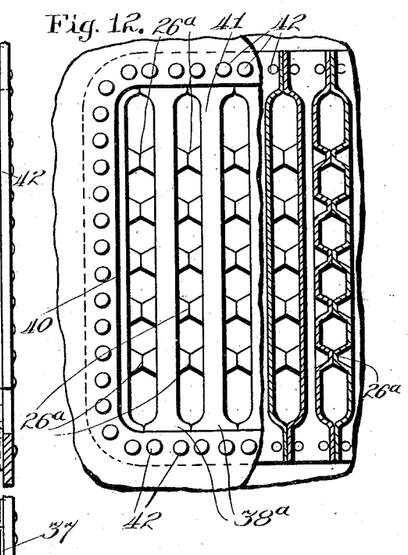
Fig. 12 is a partial end and partial sectional end elevation of the construction shown in Fig. 10.

In Figs. 10 to 12 inclusive, we show a modified form of our invention, wherein the edges of the sheets, from which the flues are formed, are bent in a reverse manner from that illustrated in Figs. 5 and 6, so that the sheet will form the adjacent side wall or half of two flues: the sheet being previously indented or impressed so as to provide the studs or teats 26ª and the sheet given a return bend as indicated at 37, see Fig. 11. The sheet is so bent as to bring the studs or teats 26ª to the outside of the sheet, that is, with the studs or teats extending in opposite directions. A second sheet similarly impressed or indented is then bent in like manner so as to form the adjacent sides or halves of two flues; with one half of the first sheet and one half of the second sheet constituting a flue. The adjacent ends of the two sheets or flue sides are then bent at right angles so as to bring the edges together at the point indicated at 38, where the edges are welded together, see Fig. 11, while the longitudinal edges of the adjacent sheet-portions which form the two halves of a flue are brought together and riveted to each other as indicated at 39, see Figs. 10 and 11, or these longitudinal edges may be secured together in any other suitable manner so as to produce a tight joint or connection. The flue area of the flue sheets 23 and 24 is cut out entirely when this construction is employed, as indicated at 40 in Fig. 12, as the return bend and bent edges of the respective sheets or halves of the flues will constitute the vertically  posed bridges intermediate of the flues and thus form the walls of the water space, as shown at 41, Fig. 12. The upper and lower ends of the bent edges of the sheets are preferably upset or flared as shown at 38ª see Fig. 12, thus providing a surface whereby the flues are riveted to the flue sheets as indicated at 42, see Fig. 12; leaving the intervening water space 29ª as shown in Fig. 11. In this modification as in the constructions previously described, the studs or teats 26ª may be slightly separated under normal conditions, namely while the boiler is not in use, so that there may be a slight yielding on the part of the walls of the flue when pressure in the water space is exerted, which will bring the registering studs or teats 26ª together and prevent collapsing of the flues or restriction of the gas passages, which would, of course, interfere with the passage of the gases therethrough.

We have chosen to illustrate the invention applied to a locomotive type of boiler, but as previously stated, it is obvious that the invention is equally as well adapted for use in connection with any steam generator, superheater, feed water heater, or boiler wherein hot gases are conducted through tubes or flues adapted to pass through the medium it is intended to heat or convert into a vapor.

By the use of our improved construction a more efficient transfer of heat from the gases of combustion to the water of the boiler is obtained than may be had where the well known type of round boiler flues are employed; the flames are given a greater cross-sectional area in the flues, being conveyed in a sheet-like cross-section so that better combustion is obtained, and therefore a higher thermal efficiency to the steam generator unit results.

In the employment of our invention long passageways or water spaces between the flues are obtained which are conducive to a better circulation of the water as it comes in contact with the hot walls of the flues; the water enters the boiler through the boiler check, not shown, but which is located in the usual position, the cool water falling to the bottom of the boiler, passing back toward the fire-box, and as it comes into contact with the hot walls of the flues, begins to rise through the long passageways or spaces between the respective flues thereby becoming thoroughly heated.

In addition to the advantages previously referred to, the cleaning or washing of the flues, when made in accordance with our invention, is made very much easier, being more readily accomplished because of the vertical position of the water spaces between the flues, thereby allowing the stream of water to be played c 1 the sides of the tubes.

As previously stated, our invention is especially adapted for use in connection with locomotives, as the construction will prevent a whipping about of the flues while the locomotive is rolling or working; a flue construction being produced possessing great vertical and transverse strength.

Our improved boiler flue construction will eliminate a great number of the difficulties encountered with the present type of round boiler flues. In steam boiler practice, the greatest item of expense is encountered in the maintenance cost of the flues which are put to severe service or strains because they are subject to the gases of combustion, of high temperature, on one side, and the pressure due to the conversion of water into steam, on the other, with the result that leaky connections soon result, which necessitate new joints being formed by rolling and beading the tubes. With our improved construction, however, the ends of the flues may be welded to the flue sheets and the repeated rolling and beading necessary with the round boiler flues is obviated and therefore the greatest expense in the maintenance of the boiler is eliminated.

The restricted gas cross-section found in the standard boiler flues is entirely eliminated by the employment of our invention, and a gas cross-section of increased dimensions is obtained, with the gases passing through the flues at a very rapid velocity, as the surface friction of the gases will be decreased, and the gas cross-section will be of such shape that no retarding or slowing down effect in the travel of the gases and products of combustion will result as is the case with the small round flues or tubes at present in use. With a large boiler flue, however, the gases will pass through the flue in a body, the center or core of which will be in a hotter condition than the edge or outside surface thereof, due to the fact that the outer edge or surface of the gas-body is cooled down by contact with the walls of the flues. The chilling or cooling down of the outer surface of the gas-body in the different flues tends to have this portion of the gas-body act as an insulating film whereby the transmission of heat from the core or center of the gas-body to the walls of the tubes or flues is prevented. In addition to the function of maintaining the walls of the flues in their proper separated relation, the different studs or teats located within the flues will cause the sheet-like form of flame and gases to be broken up and thereby destroy the insulating film ordinarily encountered in boiler flues, with the result that substantially all the heat units of the products of combustion will be transmitted to the walls of the flue or flues.

We have shown and described what we believe to be the best forms of our invention; alterations, however, may be made in certain details without departing from the spirit of our invention; and we do not wish to be understood, therefore, as limiting ourselves to the exact constructions shown and described, but

What we claim as our invention, and wish to secure by Letters Patent, is:—

1. A boiler flue composed of sheet metal provided with one or more indentations or impressions, the sheet metal being bent so as to form substantially flat parallel side walls, with the indentations or impressions arranged in the flue interior so as to prevent collapsing of the flue sides.

2. A boiler flue composed f flat sheet metal provided with a series or indentations or impressions at prearranged intervals, the sheet metal being bent so as to produce an elongated flue in cross section with the indentations or impressions on the portions of the sheet constituting the opposite side walls adapted to register with each other.

3. A boiler flue having substantially parallel side walls arranged to produce an elongated passage in cross section, and a series of spaced circular indentations or teats formed on the inner surfaces of the flue side walls, the indentations or teats of the opposite walls being adapted to register with each other.

4. Flues for boilers composed of sheet metal bent so as to provide elongated passages in cross section, the abutting edges of the sheets being secured together; with the ends of the flues arranged to be secured to the flue sheets of a boiler, the portions of the sheets adapted to constitute the side walls of the flues being arranged parallel throughout and provided with oppositely disposed symmetrical indentations or teats arranged to register with each other and prevent collapsing of the side walls of the flues.

5. Boiler flues formed of sheet metal bent to provide elongated flues in cross-section, the abutting edges of the sheets being secured together while the ends of the sheets are bent to provide bridges, while the corners of said ends are bent to adapt the flues being secured to the flue sheets of a boiler, the side walls of the flues being provided with inwardly presented and oppositely disposed indentations or impressions arranged at predetermined intervals whereby collapsing of the side walls of the flues is prevented and both vertical and horizontal passages for the gases provided.

6. Boiler flues formed of sheet metal bent so as to provide flat and substantially parallel side walls, the portions of the sheets adapted to form the side walls of the flues being provided with inwardly extending tapering indentations or impressions adapted to prevent collapsing of the side walls of the flues, with the indentations arranged so as to provide gas passages on all sides thereof.

7. Boiler flues composed of flat sheet metal provided with symmetrical circular indentations arranged at predetermined intervals, the sheet metal being bent so as to present the indentations on the inner surfaces of the flues in an opposing manner and produce vertically and horizontally disposed passages for the gases.

8. Boiler flues formed of sheet metal provided with series of symmetrical, similarly disposed, indentations spaced so as to provide passages on all sides of the indentations, the sheet metal being bent so as to provide elongated flues in cross-section, while the ends of the sheets are bent so as to constitute bridges or walls intermediate of adjacently placed flues, said ends being adapted to be secured to the flue sheets of a boiler.

HENRY W. JACOBS.

Witnesses:
GEORGE HEIDMAN,
R. E. WIGHTON.

FRANK W. SHUPERT.

Witnesses:
G. W. ADAMS,
THEODORE ADAMS.

---

Copies of this patent may be obtained for five cents each, by addressing the "Commissioner of Patents, Washington, D. C."